April 7, 1970   A. J. MISENTI   3,504,776
DRIVE SYSTEM HAVING SPLINE-TYPE QUICK DISCONNECT CLUTCH
Filed May 29, 1967   2 Sheets-Sheet 1
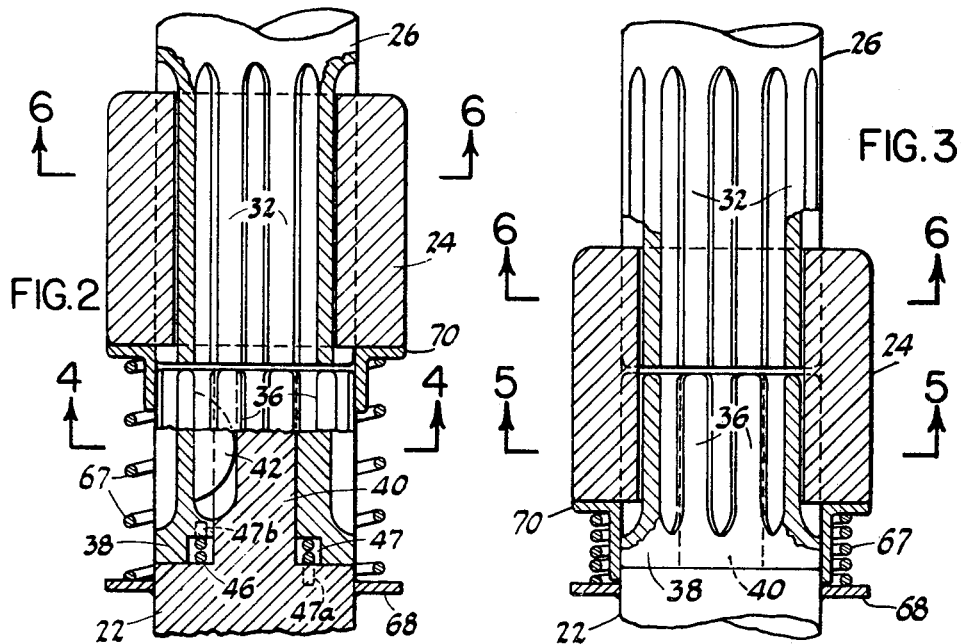
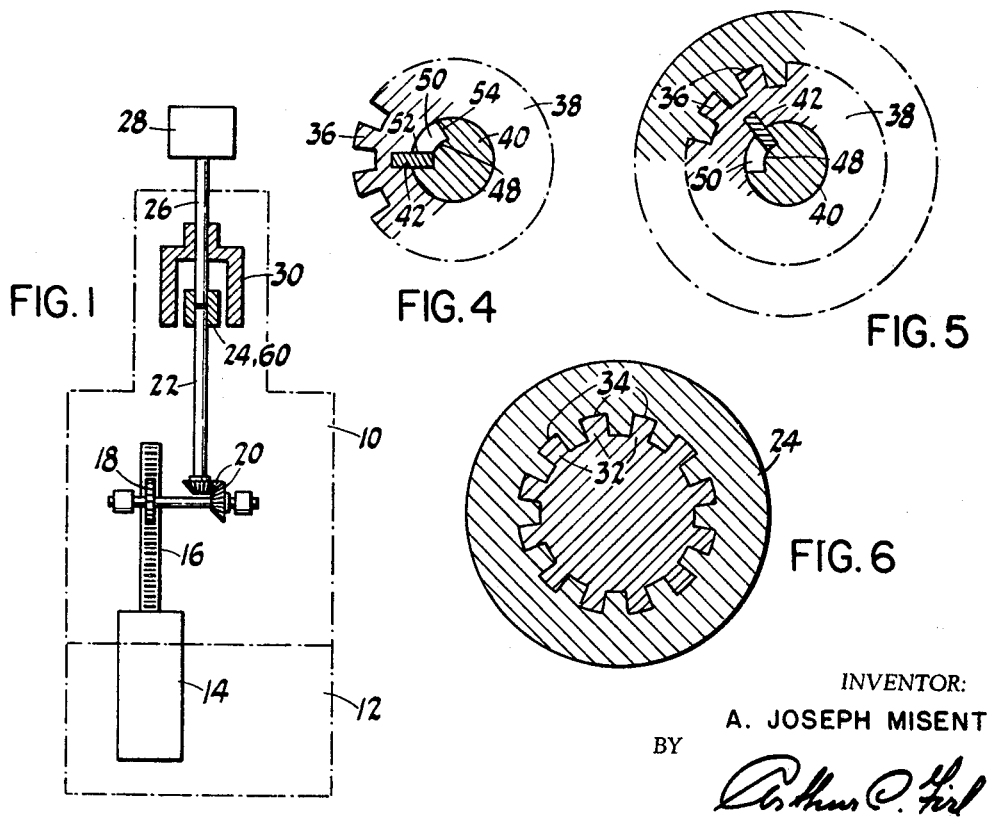
INVENTOR:
A. JOSEPH MISENTI
BY
AGENT

INVENTOR:
A. JOSEPH MISENTI

BY

*Arthur C. Firl*

AGENT

United States Patent Office 3,504,776
Patented Apr. 7, 1970

3,504,776
DRIVE SYSTEM HAVING SPLINE-TYPE QUICK DISCONNECT CLUTCH
Angelo J. Misenti, Simsbury, Conn., assignor to Combustion Engineering, Inc., Windsor, Conn., a corporation of Delaware
Filed May 29, 1967, Ser. No. 641,845
Int. Cl. F16d 7/02, 23/00, 43/20
U.S. Cl. 192—55                    4 Claims

ABSTRACT OF THE DISCLOSURE

In connection with a spline-type clutch preferably a ball bearing spline clutch, an annular portion disposed over the reduced end of the driven shaft and keyed thereto to permit sufficient lost arcuate motion between the annular portion and the driven shaft to allow time for the balls of the clutch to be lowered into the splines of the annular portion before there is substantial torque developed incident to driving the shaft.

BACKGROUND OF THE INVENTION

The invention generally relates to a drive system having a quick disconnect spline-type clutch in which external splines provided at the ends of the driving and the driven members are engaged by internal splines provided in the clutch for transmitting a torque from the driving member to the driven member.

The invention is more particularly concerned with a clutch of this type as applied to the driving mechanism of control rods in nuclear reactors.

In normal operation of nuclear reactors, the control rods are moved into and out of the reactor core to change the power level of the reactor as required. It is necessary, however, to be able to rapidly scram the control rods or move them to their innermost position in the reactor core in the event of an emergency in order to quickly shut down the reactor.

In a nuclear reactor where the control rods are driven from the top and where gravity is relied upon for scramming, it is extremely important to have great reliability in connecting or disconnecting the driving mechanism from the rods. If a rack and pinion or similar toothed device are used to move the control rod, the gravitation of the rod is resolved into a rotational force on the drive shaft and the clutch. When using a spline-type clutch, it is therefore imperative that high torque in the splines will not be developed when merely the tops or small end portions of the splines are engaged at the moment of the connection or disconnection of the driving and driven members.

In conventional devices using axial clutch teeth, attempts in disengaging these teeth when scramming must, in separating, overcome the rotational force times the coefficient of friction. A preferable disconnect clutch therefore is a ball bearing spline clutch offering axial movement under torsional load with a coefficient of rolling friction many times less than the coefficient of sliding friction of a toothed connection under similar circumstances. However, the use of a plurality of balls in a spline at the moment of connecting or disconnecting makes it even more imperative that high torque will not be developed when only one ball or a portion of one ball is engaged in the splines of the driven member. If the latter result were produced, there would be a great tendency to fracture the single ball that would be disposed in each of the driven splines and through which the high torque drive would be transmitted.

SUMMARY OF THE INVENTION

The drive system disclosed herein overcomes the above difficulties by providing a device by which application of a high torque is delayed by lost motion to allow time for the spline-type clutch to be efficiently lowered into the splines of the driven member or shaft before there is the substantial torque that will be developed incident to operating the control rod.

The invention resides in an annular member or ring provided with external splines and riding on the reduced end of the driven shaft or the driving shaft. The ring is keyed to the shaft in such a manner that a lost arcuate motion is provided between the ring and the shaft, i.e. between one extreme relative position and the other extreme relative position. The lost motion is of a duration to permit a half length of the splines or half of all the balls to engage before high torque is applied. A moderate force is provided such as by a spring which biases rotation of the ring in a direction opposite to the rotation of the driving shaft. This retains the ring in the correct extreme position, with the spring force yielding as soon as the driving splines or balls commence entering the driven splines, and permits the ring to rotate to the other extreme position of the lost motion where high torque will be applied. While rotating from the one extreme position to the other extreme position, sufficient time elapses to allow the clutch to be lowered into an efficient torque transmitting position.

It is accordingly a primary object of the invention to provide in the action of a quick disconnect spline-type clutch sufficient arcuate play or lost motion to permit engagement of a substantial length of splines or number of balls with the splines of the driven member before there is developed the high torque required to drive the control rod.

It is another object of the invention to provide a quick disconnect ball bearing spline clutch permitting axial movement under torsional load with a lower coefficient of friction, thereby to cause reliable and instantaneous scram of a control rod by gravity.

Other and further objects of the invention will become apparent to those skilled in the art as the description hereof proceeds.

BRIEF DESCRIPTION OF THE DRAWINGS

With the aforementioned objects in view, the invention is set forth in the following detailed description of illustrative embodiments shown by the accompanying drawings wherein:

FIGURE 1 is a schematic elevational view of a nuclear reactor, control rod and driving mechanism equipped with the improved spline-type clutch disclosed herein;

FIGURES 2 and 3 are enlarged views, with portions shown in section, of the driving member and driven member and the spline clutch connecting the same, with FIGURE 2 showing the clutch in the disconnected scram position, and FIGURE 3 in the connected driving position;

FIGURES 4 and 5 are cross sections through the driven member and lost motion device when taken on line 4—4 of FIGURE 2 and line 5—5 of FIGURE 3, respectively, with FIGURE 4 showing the device in one extreme position and FIGURE 5 in the other extreme position of the lost motion;

FIGURE 6 is a cross section through the driving member and clutch when taken on line 6—6 of FIGURE 2 or FIGURE 3;

DESCRIPTION OF THE PREFERRED EMBODIMENTS

Figure 7:
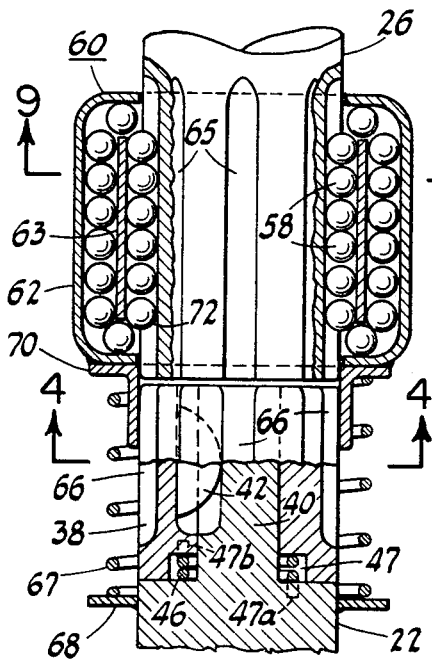
FIGURES 7 and 8 are enlarged views, with portions shown in section, of the driving member and driven member and spline clutch of the ball bearing type, with FIGURE 7 showing the clutch in the disconnected scram position and FIGURE 8 in the connected driving position.

Referring to the drawings, wherein like reference characters are used throughout to designate like elements, there is shown therein illustrative and preferred embodiments of the invention which include nuclear reactor vessel 10 having a fuel core 12. The level of power output is being controlled by means of control rod 14 moving in and out of core 12. Control rod 14 is operatively connected to a rack 16 and pinion 18 for positioning the control rod along its path of travel by means of a pair of gears 20, a driven shaft 22, a clutch 24, a driving shaft 26 and a source of driving power 28. Clutch 24 which is of the spline type is moved up and down preferably by an electromagnetic force such as provided by magnet 30.

Directing our attention to FIGS. 2, 3 and 6, which show enlarged views of the clutch mechanism, the end of driving shaft 26 is provided with external splines 32 which match internal splines 34 provided on the inside of clutch 24. The end of driven shaft 22 likewise is provided with external splines 36 identical to splines 32. In accordance with the invention, the clutch end of driven shaft 22 comprises annular portion 38 equipped with the above-mentioned splines 36 which portion is disposed over the reduced shaft end 40. This annular portion is connected to the shaft end 40 by means of key 42. A coil spring 46 located in recess 47 and attached to the shaft at its end 47a and to the annular portion at its end 47b biases the annular portion in a direction opposite to that of the rotating driving member 26. Key way 48 furnished in the reduced end 40 is of an enlarged width as shown in FIGS. 4 and 5 to provide a gap 50 permitting a lost arcuate motion or play between the annular portion 38 and reduced shaft end 40.

The width of gap 50 is such that sufficient time is permitted to elapse when lowering clutch 24, between the first contact of splines 34 and splines 36 and the full length engagement of the splines before the leading edge 52 of key 42 meets with edge 54 of key way 48 (see FIG. 4).

Figure 8:
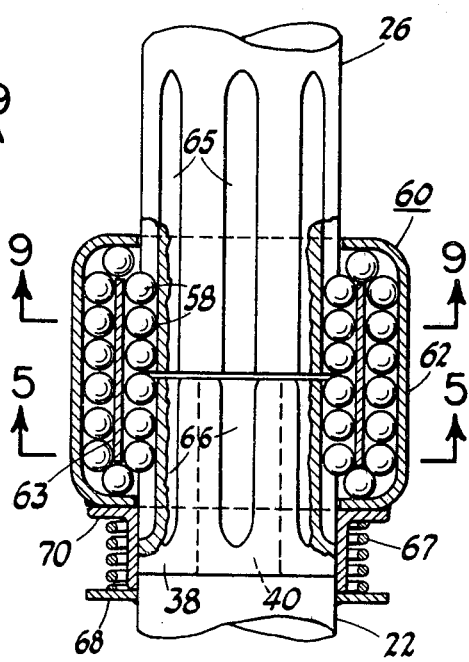
Figure 9:
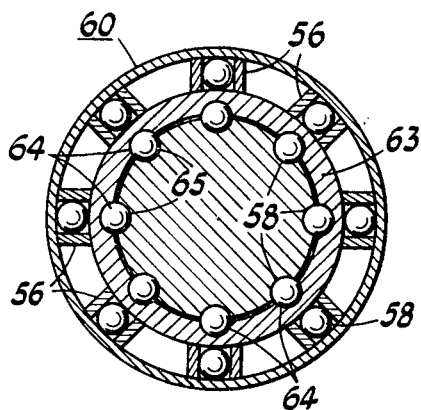
FIGURE 9 is a cross section through the driving member and ball bearing spline clutch when taken on line 9—9 of FIGURE 7 or FIGURE 8.

For a given rotational speed of the driving shaft 26, the required time interval determined by the width of gap 50 depends primarily upon the frictional resistance encountered in the engagement of internal splines 34 and external splines 36. To reduce this coefficient of friction, a type of spline clutch is preferred as shown in FIGS. 7, 8 and 9 which is provided with ball bearing races 56 in which a row of balls 58 representing the raised portion of internal splines 34 of clutch 24 are permitted to move. The ball bearing spline clutch 60 comprises an outer casing 62 enclosing races 56 including ring 63 having grooves 64 and surrounded on the inside and the outside by endless rows of balls 58. The balls of each row move from the one side of the ring 63 to the other side as the clutch is raised or lowered and the balls engage grooves 65 in the end of driving shaft 26 and grooves 66 in annular portion 40.

A spring 67 supported on a shelf is provided, which exerts a lift force of approximately 15 pounds upon ring 70 attached to clutch casing 62 to hold clutch 60 in the disconnected or scram position. To lower clutch 60 into the driving position, electromagnet 30 is energized in a well-known manner creating a downward pull of about 50 pounds which in the lowest extreme position as shown in FIG. 8 opposes a spring force now increased to 30 pounds.

A ball bearing spline clutch such as shown in FIGS. 7, 8 and 9 offers axial movement under torsional load with a coefficient of friction in the neighborhood of .006, approximately 50 times less than sliding friction under the similar circumstances encountered in the clutch mechanism of FIGS. 2, 3 and 6.

In describing operation of the clutch, it is assumed that the rotational speed of the driving shaft 26 is 6 r.p.m., the width of gap 50 .03 inch and the distance required to move clutch 60 into full mesh 1 inch. When balls 58, with the lowering of clutch 60 by magnetic force, move into driving position, the time required for the first ball 72 upon engagement with annular portion 38 to close the gap 50 is .042 second. During this time the electromagnet 30 moves clutch 60 axially a distance of 1 inch to allow full mesh of the balls, in .0105 second. Accordingly, half of the balls are in full engagement with annular portion 38 by the time key 42 makes contact with the far edge 54 of key way 48 (see FIGS. 4 and 5). It is only at this time that the high torque will be applied incident to driving the control rod 14.

During scramming operation, the above-described sequence of procedure is reversed.

While I have illustrated and described preferred embodiments of my invention, it is to be understood that such are merely illustrative and not restrictive and that variations and modifications may be made therein without departing from the spirit and scope of the invention. I therefore do not wish to be limited to the precise details set forth but desire to avail myself of such changes as fall within the purview of my invention.

I claim:

1. A drive system for a nuclear reactor control rod having a driving shaft and a driven shaft including mutually adjacent shaft ends organized for rotation, and annular clutch means slidingly bridging said adjacent shaft ends, the improvement comprising in combination: an annular portion disposed over one of said shaft ends for arcuate movement between it and said one shaft end, said annular portion and the other shaft end being provided with external splines, said clutch means being provided with internal splines, a plurality of balls disposed in each of said internal splines, said balls being closely aligned in axial direction with respect to said shaft ends, and coacting with said external splines for transmitting a torque from said driving shaft to said driven shaft, said plurality of balls in each spline forming a spline-engaged portion of an endless row of balls having in addition a spline-disengaged portion of balls aligned parallel to and radially spaced from said spline-engaged portion with respect to the center of said shaft ends, a ball race adapted to maintain the spaced relation between said spline-engaged portion and said spline-disengaged portion and adapted to confine said portions in parallel relation with the axis of said shaft ends, means for movement of said clutch in an axial direction for engaging or disengaging respectively, said annular portion with or from said other shaft end, means for limiting said arcuate movement of said annular portion with respect to said one shaft end, and means for yieldingly opposing said arcuate movement in a direction opposite to the direction of rotation of said driving shaft, whereby a lost motion is provided for allowing time for efficient engagement of said plurality of closely aligned balls before a substantial torque is developed incident to driving said driven shaft.

2. A control rod drive system as defined in claim 1 wherein said means for yieldingly opposing said arcuate movement comprise spring means.

3. A control rod drive system as defined in claim 1 wherein said means for movement of said clutch comprise electromagnetic means.

4. A control rod drive system as defined in claim 3 provided with spring means yieldingly opposing the force of said electromagnetic means.

References Cited

UNITED STATES PATENTS

| 1,036,560 | 8/1912 | Campbell | 192—108 |
| 1,939,226 | 12/1933 | Raven | 192—55 XR |
| 2,011,822 | 8/1935 | Munschaver | 192—55 XR |
| 2,291,151 | 7/1942 | Dunn | 192—67 XR |
| 2,950,796 | 8/1960 | Becker | 192—55 XR |
| 3,084,776 | 4/1963 | Rabinow | 192—67 XR |

MARTIN P. SCHWADRON, Primary Examiner

LESLIE J. PAYNE, Assistant Examiner

U.S. Cl. X.R.

192—67, 84, 108